United States Patent
Hauske

(10) Patent No.: US 8,918,444 B2
(45) Date of Patent: Dec. 23, 2014

(54) METHOD AND DEVICE FOR FILTERLING AN INPUT SIGNAL

(75) Inventor: Fabian Nikolaus Hauske, München (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 393 days.

(21) Appl. No.: 13/432,882

(22) Filed: Mar. 28, 2012

(65) Prior Publication Data

US 2012/0185523 A1    Jul. 19, 2012

Related U.S. Application Data

(63) Continuation of application No. PCT/CN2010/070866, filed on Mar. 4, 2010.

(51) Int. Cl.
| | | |
|---|---|---|
| *G06F 17/10* | (2006.01) | |
| *H04B 10/60* | (2013.01) | |
| *H04B 10/2513* | (2013.01) | |
| *H04L 7/027* | (2006.01) | |

(52) U.S. Cl.
CPC .......... *H04B 10/60* (2013.01); *H04B 10/25133* (2013.01); *H04L 7/027* (2013.01)
USPC ....................................... 708/300

(58) Field of Classification Search
CPC ... H03H 17/06; H03H 17/0294; H03H 17/02; H03H 17/04; H03H 17/0223
USPC ....................................... 708/300
See application file for complete search history.

(56) References Cited

U.S. PATENT DOCUMENTS

| | | | | |
|---|---|---|---|---|
| 4,340,875 A | * | 7/1982 | English | ..................... 708/319 |
| 7,596,323 B1 | | 9/2009 | Price et al. | |
| 2003/0074381 A1 | | 4/2003 | Awad et al. | |
| 2003/0137912 A1 | * | 7/2003 | Ogura | ..................... 369/47.39 |

(Continued)

FOREIGN PATENT DOCUMENTS

| | | |
|---|---|---|
| CN | 1734988 A | 2/2006 |
| CN | 101411063 A | 4/2009 |
| EP | 0551081 A2 | 7/1993 |
| SU | 1840322 A1 | 9/2006 |

OTHER PUBLICATIONS

Extended European Search Report issued in corresponding European Patent Application No. 10846855.4, mailed Aug. 14, 2012.

(Continued)

*Primary Examiner* — Tan V. Mai
(74) *Attorney, Agent, or Firm* — Brinks Gilson & Lione

(57) ABSTRACT

The filter device includes a filter for filtering the input signal with a first set of filter coefficients, and for filtering the input signal with a second set of coefficients, a frequency domain correlator for correlating a first subset of frequency domain components of the first filtered signal to obtain a first correlation value, and for correlating a second subset of frequency domain components of the second filtered signal to obtain a second correlation value, wherein the first subset of correlated frequency domain components and the second subset of correlated frequency domain components are respectively located within a predetermined range of the correlated signals, and a processor for selecting either the first set of filter coefficients or the second set of filter coefficients upon the basis of the first correlation value and the second correlation value for filtering the input signal.

15 Claims, 4 Drawing Sheets

(56) References Cited

U.S. PATENT DOCUMENTS

| | | |
|---|---|---|
| 2004/0252754 A1 | 12/2004 | Wood et al. |
| 2006/0034614 A1 | 2/2006 | Chen et al. |
| 2008/0205905 A1 | 8/2008 | Tao et al. |
| 2009/0172060 A1 | 7/2009 | Talegb et al. |

OTHER PUBLICATIONS

Office Action issued in corresponding Russian Patent Application No. 2012117904/07m mailed May 21, 2013, 9 pages.

Kuschnerov, Maxim et al. "DSP for Coherent Single-Carrier Receivers" Journal of Lightwave Technology. vol. 27. No. 16. Aug. 15, 2009: 3614-3622.

Hauske, Fabian N. "Optical Performance Monitoring in Digital Coherent Receivers" Journal of Lightwave Technology. vol. 27. No. 16. Aug. 15, 2009:3623-3631.

International Search Report issued in corresponding PCT Application No. PCT/CN2010/070866; mailed Dec. 9, 2010.

\* cited by examiner

METHOD AND DEVICE FOR FILTERLING AN INPUT SIGNAL

CROSS-REFERENCE TO RELATED APPLICATION

This application is a continuation of International Application No. PCT/CN2010/070866, filed on Mar. 4, 2010, entitled "FILTER DEVICE", which is hereby incorporated herein by reference in its entirety.

TECHNICAL FIELD

The present disclosure relates to filter devices.

BACKGROUND

In today's high speed communication systems, optical components are employed in order to transmit information using optical signals. Usually, optical signals are transmitted over optical fibers, which, unfortunately, distort the transmitted signal due to different transmission channel characteristics at different wavelengths. The distortion may comprise wavelength-specific attenuation or chromatic dispersion, the later resulting when signals components at different wavelengths propagate with different velocities along the optical communication channel.

In order to compensate for the distortion, a digital filter may be employed at the receiver to improve the signal's quality for a subsequent detection of the transmitted information. For digitally filtering the received optical signal, first an optical coherent demodulation and, subsequently, an optical-to-electrical conversion upon the basis of e.g. light sensitive diodes are performed. Finally, an analog-to-digital converter (ADC) provides the digitized signal. Nevertheless, the resulting digital signal still comprises residual distortion, e.g. chromatic dispersion, which can be reduced by way of digital filtering.

For chromatic dispersion filtering, an efficient filter as known from M. Kuschnerov, F. N. Hauske, K. Piyawanno, B. Spinnler, A. Napoli, and B. Lankl, "Adaptive Chromatic Dispersion Equalization for Non-Dispersion Managed Coherent Systems", OFC 2009, paper OMT1, may be employed. The filter described therein is based upon an error criterion $u(t)=|s(t)|^2-R$ which is derived from a complex value time domain signal s(t), where R denotes expectation power. This approach relates to the known constant modulus algorithm (CMA). In order to adapt the filter in the frequency domain, the error signal u(t) is transferred to the frequency domain in order to update the filtering function, i.e. the filter coefficients. After a plurality of consecutive updates, the filter will approximate the ideal filter function $H_{dis}^{-1}(\omega)$ determining the filter coefficients and representing an inverse of the channel filter function introducing chromatic dispersion.

SUMMARY

According to an aspect, the disclosure relates to a filter device for filtering an input signal, the input signal comprising a clock signal having a clock frequency. The filter device comprises a filter for filtering the input signal with a first set of filter coefficients to obtain a first filtered signal, and for filtering the input signal with a second set of coefficients to obtain a second filtered signal, a frequency domain correlator for correlating a first subset of frequency domain components of the first filtered signal to obtain a first correlation value, and for correlating a second subset of frequency domain components of the second filtered signal to obtain a second correlation value, wherein the first subset of correlated frequency domain components and the second subset of correlated frequency domain components are respectively located within a predetermined range of the correlated signals comprising the clock frequency, and a processor for selecting either the first set of filter coefficients or the second set of filter coefficients upon the basis of the first correlation value and the second correlation value for filtering the input signal. The filter and/or the correlator and/or the processor may work in frequency domain.

According to a further aspect, the disclosure relates to a computer program for performing the method for filtering an input signal when run on a computer.

BRIEF DESCRIPTION OF THE DRAWINGS

Further embodiments of the disclosure will be described with reference to the following figures, in which.

DETAILED DESCRIPTION OF EMBODIMENTS OF THE INVENTION

Figure 1:
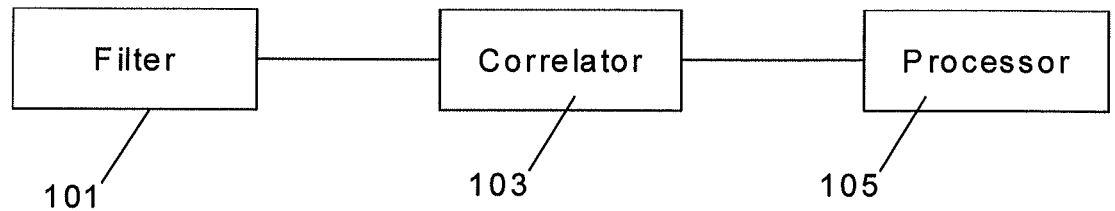
FIG. 1 shows a block diagram of a filter device according to an implementation form.

FIG. 1 shows a filter device comprising a filter 101 for filtering an input signal with a first set of filter coefficients to obtain a first filtered signal. The filter may comprise a second set of filter coefficients for filtering the input signal to obtain a second filtered signal. Downstream the filter 101, a frequency domain correlator 103 is provided for correlating a respective subset of frequency domain components of the first filtered signal to obtain different correlation values. By way of example, the frequency domain components occupy a spectral range which comprises the spectral frequency of the clock tone. By way of example, the full spectrum range of the frequency domain components may be employed for correlation. According to some embodiments, also a sub-range of correlation sequences having spectra comprising the clock frequency may be employed. Still according to some implementation forms, after correlating a full spectral range filtered signals, the resulting correlation sequences may be band-limited to comprise frequency spectrum around the clock frequency. The frequency spectrum may have a frequency range which is defined by the predetermined frequency range. Furthermore, a processor 105 is arranged after the frequency domain correlator 103 for selecting the first or the second set of filter coefficients for further filtering. By way of example, the processor 105 may select the maximum value of the correlation values and select the respective set of filter coefficients associated therewith.

Furthermore, a Fourier transformer may be arranged before the filter 101 or thereafter in order to provide frequency domain components of the respective filtered signal towards the processor 105.

Figure 2:
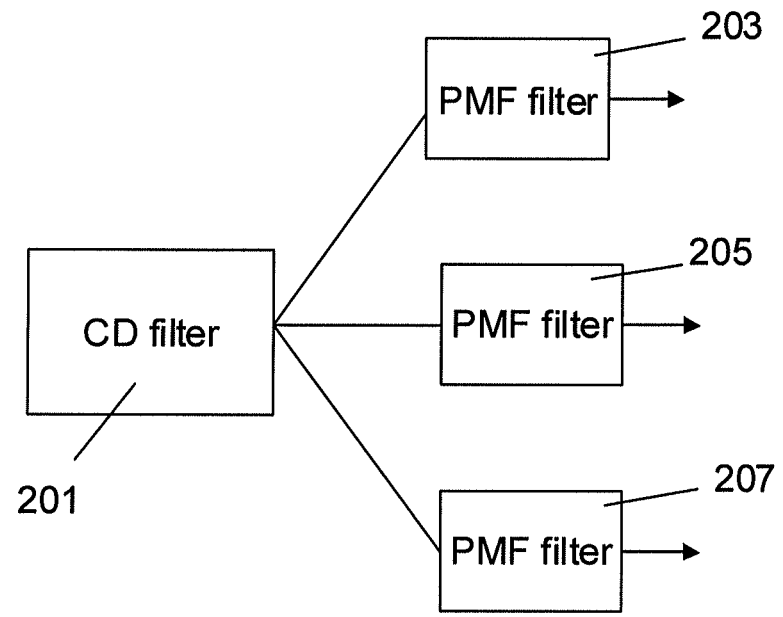
FIG. 2 shows a block diagram of a filter according to an implementation form.

FIG. 2 shows an implementation form of the filter 101 shown in FIG. 1. The filter comprises a chromatic dispersion filter 201 and a plurality of polarization mode dispersion filters 203 to 205 arranged downstream the chromatic dispersion filter. The polarization mode dispersion filters 203 to 205 form e.g. SOP filter (SOP: State of Polarization) and are configured to rotate a polarization of an output signal of the chromatic dispersion filter 201 by a different rotation angle to obtain a plurality of filtered signals. The correlator 103 may determine e.g. an auto-correlation of each of the plurality of the filtered signals and to sum up the correlation sequences being associated with the predetermined frequency range around the clock tone to obtain a first correlation value. At a further time instant, the chromatic dispersion filter 201 may filter an input signal with a different chromatic dispersion filter characteristic so that, after filtering and correlating, a second correlation value may be provided.

Figure 3:
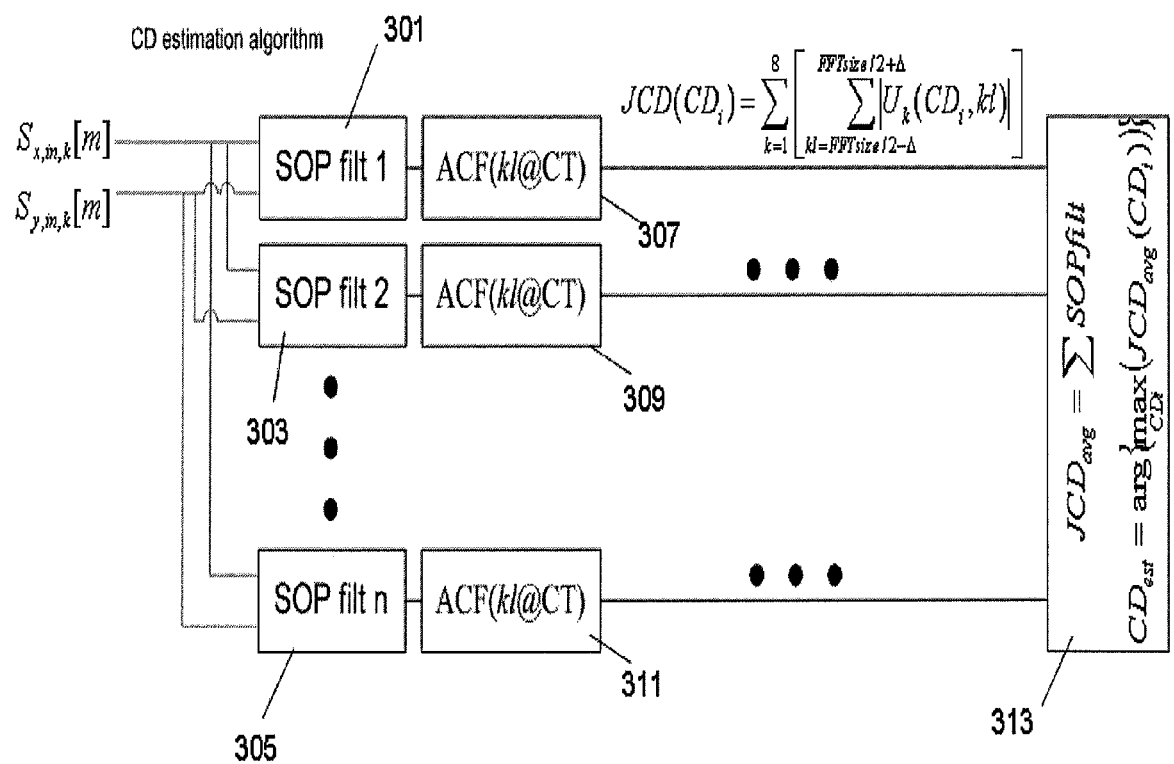
FIG. 3 shows a block diagram of a filter device according to an implementation form.

FIG. 3 shows a filter device comprising a plurality of polarization rotation filters 301, 303 and 305. After each filter 301 to 305, a correlator 307, 309 and 311 for determining an auto-correlation of a respective filtered signal is provided. The correlation sequences are provided towards a processor 313 which may e.g. operate upon the basis of the formula depicted in FIG. 3 and addressed in the following in order to select the respective set of coefficients of the chromatic dispersion filter which is not shown in FIG. 3 and which is arranged before the filters 301 to 305.

With reference FIG. 3, the filter bank with several polarization mode dispersion filters 203 to 205, e.g. SOP rotation filters, is applied. This SOP filter stage makes the approach independent from polarization rotations.

Each SOP filter 303 to 305 rotates the signal by a different polarization rotation angle θ by $$\begin{bmatrix} S'_{x,in,k}[m] \\ S'_{y,in,k}[m] \end{bmatrix} = \begin{bmatrix} \cos\theta & \sin\theta \\ -\sin\theta & \cos\theta \end{bmatrix} \begin{bmatrix} S_{x,in,k}[m] \\ S_{y,in,k}[m] \end{bmatrix}$$

After each filter, the ACF (ACF: Auto-Correlation Function) of both contributions from x-polarization and y-polarization may be added $$U_k(CD_i, kl) = ACF(S'_{in,k,x}[m]) + ACF(S'_{in,k,y}[m])$$
$$= \sum_{m=1}^{FFT\_size} (cshift(S'_{in,k,x}[m], kl) \cdot S^*_{in,kl,x}[m]) +$$
$$\sum_{m=1}^{FFT\_size} (cshift(S'_{in,k,y}[m], kl) \cdot S^*_{in,kl,y}[m])$$

The ACF is only evaluated around a shift of Δ around the clock tone (CT) frequency, which is at FFTsize/2 for systems with a sampling rate of 2 sps. In this regard, the aforementioned predetermined frequency range may correspond to Δ or to 2Δ. Optionally, the average over each ACF and over each SOP filter branch may be calculated. By way of example, the argument of the maximum of the resulting function $$JCD(CD_i) = \sum_{SOP} \sum_{k=1}^{8} \left[ \sum_{kl=FFTsize/2-\Delta}^{FFTsize/2+\Delta} |U_k(CD_i, kl)| \right]$$

leads to the estimated CD, wherein the index i denotes the i-th set of filter coefficients for chromatic dispersion filtering and k the k-th input signal. In particular, the maximum of the above function is associated with a certain set of filter coefficients for chromatic dispersion filtering.

With reference to the above formula, the values of the correlation sequences |$U_k(CD_i,kl)$| are summed up, $$\sum_{kl=FFTsize/2-\Delta}^{FFTsize/2+\Delta} |U_k(CD_i, kl)|,$$

to obtain, for each CD filter, a correlation value which may be used for selecting the optimum CD filter.

Furthermore, a plurality of input signals may be processed according to the formula $$\sum_{k=1}^{8} \left[ \sum_{kl=FFTsize/2-\Delta}^{FFTsize/2+\Delta} |U_k(CD_i, kl)| \right]$$

to obtain, for each CD filter, a correlation value which may be used for selecting the optimum CD filter.

Furthermore, also a plurality of e.g. SOP filters may be taken into consideration according to the formula $$\sum_{SOP} \sum_{k=1}^{8} \left[ \sum_{kl=FFTsize/2-\Delta}^{FFTsize/2+\Delta} |U_k(CD_i, kl)| \right]$$

to obtain, for each CD filter, a correlation value by summing over the outputs of the SOP filters which may be used for selecting the optimum CD filter.

According to some implementations, knowing the certain set of filter coefficients for chromatic dispersion, also the CD may also be estimated:

$$CD_{est} = \arg\left\{\max_{CDi}(JCD(CD_i))\right\}$$

The estimated CD value or the set of filter coefficients mitigating the estimated CD value may be applied in a FD CD filter for further filtering.

Figure 4:
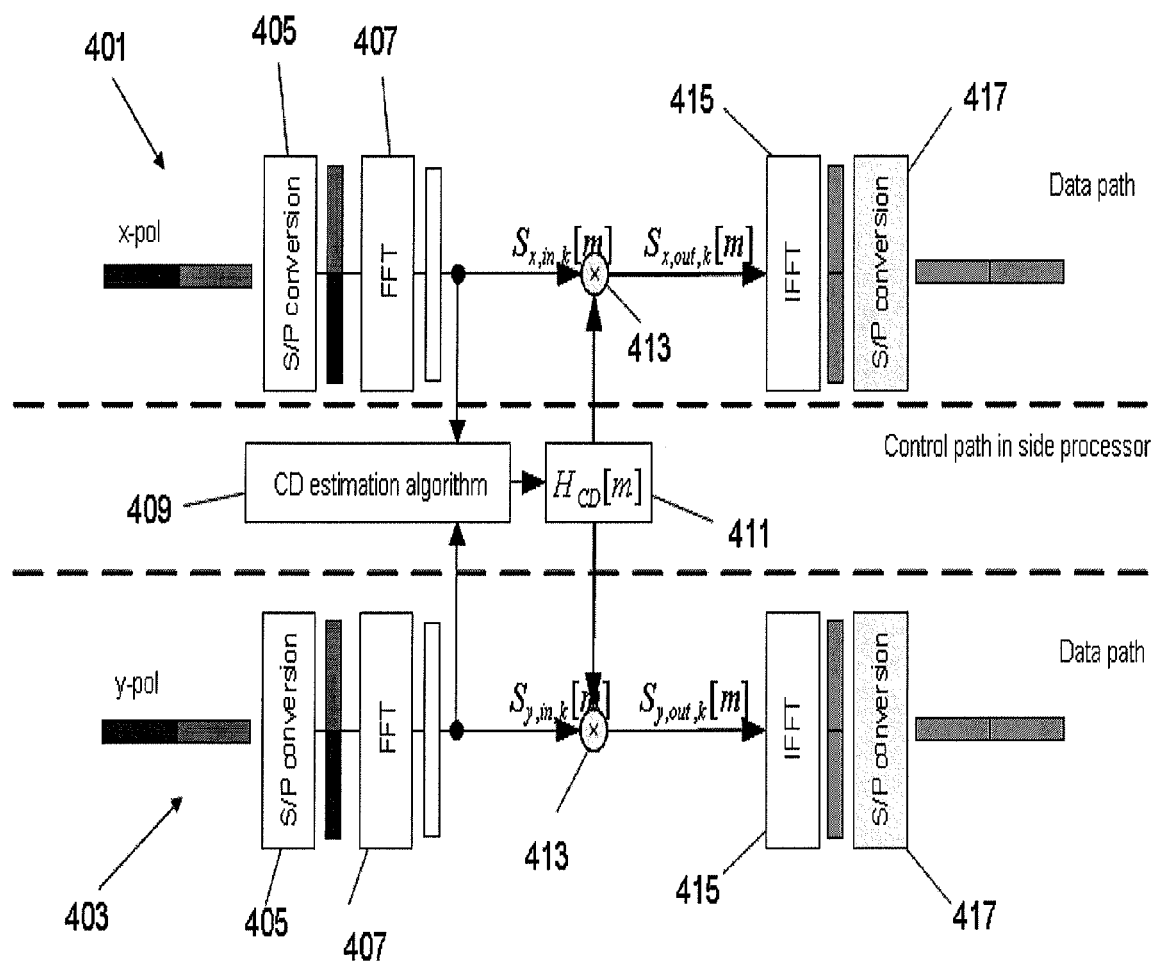
FIG. 4 shows a block diagram of a filter device according to an implementation form.

FIG. 4 shows a filter device for filtering a digital, optical signal having an X-polarization and an Y-polarization. Thus, the filter device comprises a X-data path 401 and an Y-data path 403. In each path, a serial-to-parallel conversion block 405 followed by a Fourier transformer 407 is arranged. The outputs of the respective Fourier transformer 407 are provided to a filter device 409 operating upon the basis of the principles described herein. The filter device selects an appropriate set of filter coefficients for the filter 411, which may be a chromatic dispersion filter. Since the filter operation, in each path, is performed in frequency domain, the frequency domain filtering is reduced to a multiplication which, in each path, may be performed upon the basis of a corresponding multiplier 413. The outputs of the multiplier 413 are provided, respectively, to an inverse Fourier transformer 415, wherein, after serial-to-parallel conversion in the respective serial-to-parallel conversion block 417, a filtered signal is provided.

By way of example, the structure of FIG. 4 may be applied for chromatic dispersion filtering in optical systems.

During propagation along the fiber, the optical signal is prone to chromatic dispersion which induces a velocity difference as a function of the frequency which may be characterized by the transfer function $$H_{dis}(\omega) = e^{j \cdot \omega^2 \cdot \beta_2 \cdot L/(8\pi^2)}$$

where L is the length of the fiber, $\beta_2$ is the parameter of group velocity difference and $\omega$ is the radian frequency which relates by $\omega = 2\pi f$ to the angular frequency. The inverse function $H_{dis}^{-1}(j\omega)$ is $$H_{dis}^{-1}(\omega) = e^{-j \cdot \omega^2 \cdot \beta_2 \cdot L/(8\pi^2)}$$

which satisfies $H_{dis}^{-1}(\omega) H_{dis}(\omega) = 1$. As long as the optical path is not altered, the value of residual chromatic dispersion $$CD = -\beta_2 \frac{2\pi c L}{\lambda^2}$$

stays constant over time.

The steps for frequency domain compensation may be as follows:

Step 1: Conduct a fast Fourier transformation (FFT) to transfer the received signal r(t) into the frequency domain to yield R(f).

Step 2: Multiply the signal R(f) with $H_{dis}^{-1}(\omega)$ to yield $H_{dis}^{-1}(\omega) R(f) = S(f)$ Step 3: Conduct an inverse FFT (IFFT) on S(f) to receive the time domain representation s(t) of the chromatic dispersion compensated signal.

The filter structure shown in FIG. 4 may be applied in a "slow" control path, which may be implemented in a DSP. This relaxes the implementation of the high-speed implementation of the ASIC in the data-path. Blocks of the FD signal are "down-loaded" into the DSP, where the CD estimation is performed. The estimated CD generates an corresponding filter function, which is loaded into the CD compensation filter.

Figure 5:
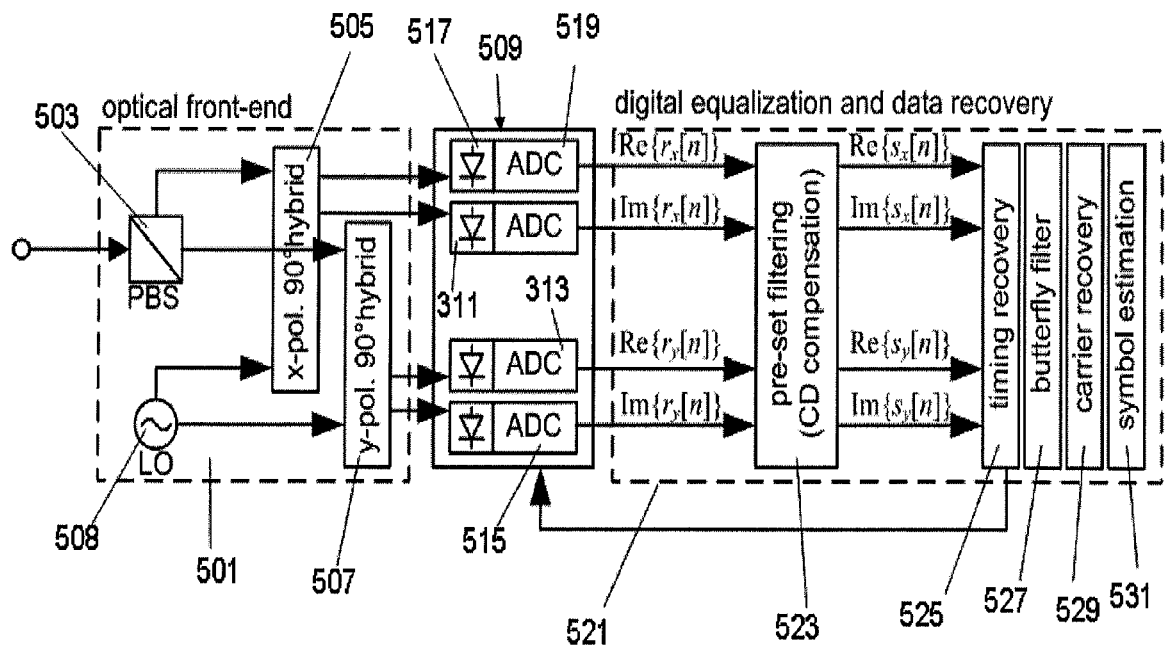
FIG. 5 shows a block diagram of a digital receiver with equalization according to an implementation form.

FIG. 5 shows a structure of a digital coherent receiver with equalization. The receiver comprises an optical front-end 501 comprising a polarization beam splitter 503 having a first output coupled to a first hybrid 505 and a second output coupled to a second hybrid 507. The optical front-end 501 further comprises a local oscillator 508 having two outputs respectively coupled to the respective hybrid 505 and 507. The hybrids 505 and 507 may comprise circuitry to determine two signals shifted by 90° upon the basis of the respective input signal. Thus, each hybrid 505, 507 comprises two outputs for providing a so-called complex valued signal having components shifted by 90°. In particular, the first hybrid 505 comprises a first input coupled to a first converting means 509, and a second output coupled to a second converting means 511. Correspondingly, a first output of the second hybrid is coupled to a first converting means 513 and to a second converting means 515. Each converting means 509 to 515 may comprise an optical diode 517 for transforming the respective optical signal provided by the respective hybrid 505, 507 into a corresponding electric signal. In addition, each path can be also detected by a pair of photo diodes with the received signal being the difference of each diode in a balanced detection manner. Furthermore, each transforming means 509 to 515 may comprise an analog-to-digital converter 519 for converting the analog electric signal provided by the respective diode 517 into digital domain. The outputs of the transforming means 511 to 515 may be coupled to a digital equalization and data recovery means 521 comprising an adaptive filter 523 according to the principles of the present disclosure.

The adaptive filter 523 receives an input signal comprising e.g. four input signal portions. The first input signal portion, Re{rx[n]}, Im{rx[n]} represents the x-polarization, and the second input signal portion, Re{ry[n]}, Im{ry[n]} represents the y-polarization.

The adaptive filter 523 is adapted in frequency domain upon the basis of the received input signals. After filtering and transforming the filtered signals into time domain, the respective filtered signals in time domain, Re{sx[n]}, Im{sx[n]}, Re{sy[n]}, Im{sy[n]}, are provided to optional signal processing blocks, e.g. comprising a timing recovery 525, a butterfly filter 527, a carrier recovery 529 and a symbol estimation 531 according to any of the known approaches for timing recovery, butterfly filter, carrier recovery and symbol estimation.

With reference to FIG. 5, the frequency domain dispersion compensation block is applied after the analogue-to-digital conversion (ADC) and before the timing recovery block. Thus it relaxes the conditions for required dispersion tolerance of the timing recovery algorithms. The frequency domain dispersion compensation itself is robust against timing frequency and timing phase deviations. The identical filtering function is applied to the received signal from both polarizations x and y.

Figure 6:
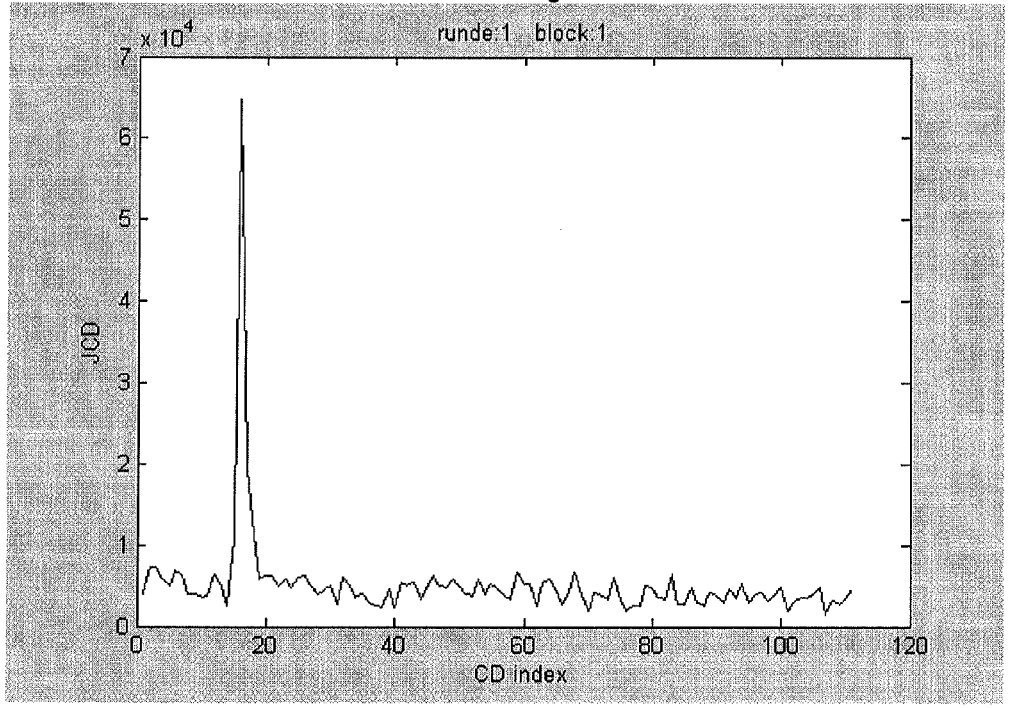
FIG. 6 shows an estimation example according to an implementation form.

FIG. 6 shows, by way of example, an estimation sample demonstrating the high peak to mean ratio of the maximum argument in associated with a certain CD index.

According to some implementation forms, the filter selection approach described herein allows for an estimation independent from the modulation format or the data rate and is suitable for any coherent optical transmission system.

According to some implementation forms, by calculating the estimation variable directly in the FD, the estimation procedure may be speeded up and may allow a faster acquisition speed. Furthermore, it is not necessary to obtain the CMA expectation gain.

According to some implementation forms, the implementation complexity may be decreased, wherein the estimation may be increased, wherein the peak-to-mean ratio may allow a simple implementation even with reduced precision variables.

According to some implementation forms, the approaches described herein may be further applied for chromatic dispersion monitoring at any place in the transmission link with only low-speed ADCs and asynchronous sampling. Once coherent receivers become integrated this opens the way for new devices for optical performance monitoring.

The invention claimed is:

1. A filter device for filtering an input signal, the input signal comprising a clock signal having a clock frequency, the filter device comprising:
   a filter that filter the input signal with a first set of filter coefficients to obtain a first filtered signal, and that filters the input signal with a second set of coefficients to obtain a second filtered signal;
   a frequency domain correlator that correlates a first subset of frequency domain components of the first filtered signal to obtain a first correlation value, and that correlates a second subset of frequency domain components of the second filtered signal to obtain a second correlation value, wherein the first subset of correlated frequency domain components and the second subset of correlated frequency domain components are respectively located within a predetermined range of the correlated signals comprising the clock frequency; and a processor that selects either the first set of filter coefficients or the second set of filter coefficients upon the basis of the first correlation value and the second correlation value for filtering the input signal.

2. The filter device according to claim 1, wherein the frequency domain correlator is configured to correlate the first subset of the frequency domain components to obtain a first correlation sequence in frequency domain and to sum up values of the first correlation sequence to obtain the first correlation value, and to correlate the second subset of the frequency domain components to obtain a second correlation sequence in frequency domain and to sum up values of the second correlation sequence to obtain the second correlation value.

3. The filter device according to claim 1, wherein the processor is configured to select the first set of filter coefficients if the first correlation value is greater than or equal to the second correlation value, or to select the second set of filter coefficients if the second correlation value is greater than the first correlation value.

4. The filter device according to claim 1, wherein the filter is configured to filter a plurality of input signals with the first set of filter coefficients to obtain a plurality of first filtered signals, and to filter the plurality of input signals with the second set of coefficients to obtain a plurality of second filtered signals;

the frequency domain correlator is configured to correlate a first subset of frequency domain components of each first filtered signal to obtain a plurality of first correlation values, and to correlate a second subset of frequency domain components of the plurality of second filtered signals to obtain a plurality of second correlation values, wherein each subset of correlated frequency domain components is located within the predetermined frequency range comprising the clock frequency; and wherein the processor is configured to sum up the plurality of first correlation values to obtain the first correlation value, to sum up the plurality of second correlation values to obtain the first correlation value, and to select the first set of filter coefficients if the first correlation value is greater than or equal to the second correlation value, or to select the second set of filter coefficients if the second correlation value is greater than the first correlation value.

5. The filter device according to claim 1, wherein the first set of filter coefficients and the second set of filter coefficients respectively comprise a different chromatic dispersion filter characteristic for differently filtering the input signal.

6. The filter device according to claim 1, wherein the first set of filter coefficients and the second set of filter coefficients respectively comprise a polarization mode dispersion filter characteristic, a polarization rotation filter in particular for polarization rotation filtering with equal or with different polarization angles.

7. The filter device according to claim 1, wherein the first set of filter coefficients comprises a plurality of first sub-sets of filter coefficients, the plurality of first sub-sets of filter coefficients respectively comprising a first chromatic dispersion filtering characteristic and different polarization mode dispersion characteristics, the second set of filter coefficients comprises a plurality of second sub-sets of filter coefficients, the plurality of second sub-sets of filter coefficients respectively comprising a second chromatic dispersion filtering characteristic and different polarization mode dispersion characteristics, wherein the filter is configured to filter the input signal by the plurality of first sub-sets of filter coefficients to obtain a plurality of first filtered signals, and to filter the input signal by the plurality of second sub-sets of filter coefficients to obtain a plurality of second filtered signals, the frequency domain correlator is configured to correlate a first subset of frequency domain components of each first filtered signal to obtain a plurality of first correlation values, and to correlate a second subset of frequency domain components of each second filtered signal to obtain a plurality of second correlation values, wherein each subset of correlated frequency domain components is located in the predetermined frequency range comprising the clock frequency; wherein the processor is configured to sum up the plurality of first correlation values to obtain the first correlation value, to sum up the plurality of second correlation values to obtain the first correlation value, and to select the first set of filter coefficients if the first correlation value is greater than or equal to the second correlation value, or to select the second set of filter coefficients if the second correlation value is greater than the first correlation value.

8. The filter device according to claim 1, wherein the filter comprises a chromatic dispersion filter and a plurality of polarization mode dispersion filters arranged downstream the chromatic dispersion filter, the chromatic dispersion filter being configured to successively filter the input signal using the first set of filter coefficients and the second set of filter coefficients to obtain the first filtered signal and the second filtered signal, and wherein the plurality of polarization mode dispersion filters is respectively configured to successively filter the first filtered signal and the second filtered signal to obtain a plurality of first filtered signals and second filtered signals.

9. The filter device according to claim 1, wherein the frequency domain correlator is configured to auto-correlate the respective subset of frequency domain components or to cross-correlate components of different optical polarizations.

10. The filter device according to claim 1, further comprising a Fourier transformer for transforming the input signal or the respective first or second filtered signal into frequency domain.

11. The filter device according to claim 1, wherein the processor is configured to increase the clock frequency by a predetermined increment or to decrease the clock frequency by a predetermined decrement to determine the predetermined frequency range.

12. The filter device according to claim 1, wherein the input signal is a copy of a receive signal, and wherein the filter is configured to filter the receive signal by the selected set of filter coefficients for further processing.

13. The filter device according to claim 1, wherein the input signal comprises a first input signal portion being associated with a first optical polarization, and a second input signal portion being associated with a second optical polarization.

14. A method filtering an input signal, the input signal comprising a clock signal having a clock frequency, the method comprising:

filtering, by a filter, the input signal with a first set of filter coefficients to obtain a first filtered signal, and for filtering the input signal with a second set of coefficients to obtain a second filtered signal;

correlating, by a frequency domain correlator, a first subset of frequency domain components of the first filtered signal to obtain a first correlation value and correlating a second subset of frequency domain components of the second filtered signal to obtain a second correlation value, wherein the first subset of correlated frequency domain components and the second subset of correlated frequency domain components are respectively located in a predetermined frequency range comprising the clock frequency; and selecting, by a processor, either the first set of filter coefficients or the second set of filter coefficients upon the basis of the first correlation value and the second correlation value for filtering the input signal.

15. A non-transitory computer readable medium, comprising computer program codes stored thereon, executable by a processor, wherein the computer program codes comprise a computer program for filtering an input signal, the input signal comprising a clock signal having a clock frequency, the computer program having instructions for:

filtering the input signal with a first set of filter coefficients to obtain a first filtered signal, and for filtering the input signal with a second set of coefficients to obtain a second filtered signal;

correlating a first subset of frequency domain components of the first filtered signal to obtain a first correlation value and correlating a second subset of frequency domain components of the second filtered signal to obtain a second correlation value, wherein the first subset of correlated frequency domain components and the second subset of correlated frequency domain components are respectively located in a predetermined frequency range comprising the clock frequency; and selecting either the first set of filter coefficients or the second set of filter coefficients upon the basis of the first correlation value and the second correlation value for filtering the input signal.

* * * * *

UNITED STATES PATENT AND TRADEMARK OFFICE
CERTIFICATE OF CORRECTION

PATENT NO. : 8,918,444 B2
APPLICATION NO. : 13/432882
DATED : December 23, 2014
INVENTOR(S) : Fabian Nikolaus Hauske Page 1 of 1

It is certified that error appears in the above-identified patent and that said Letters Patent is hereby corrected as shown below:

On the Title Page and In the Specification

Left column and Column 1, in the title, replace "FILTERLING" with --FILTERING--.

Signed and Sealed this
Twenty-first Day of April, 2015

Michelle K. Lee
*Director of the United States Patent and Trademark Office*